(No Model.)

S. H. MACOMBER.
CLUTCH FOR ROCK DRILLING MACHINES.

No. 490,152. Patented Jan. 17, 1893.

Witnesses:
E. A. Braudau
Wilson D. Bent Jr.

Inventor:
Symn H. Macomber
By his Atty
John Richards

UNITED STATES PATENT OFFICE.

SQUIRE H. MACOMBER, OF CHICAGO, ILLINOIS, ASSIGNOR OF ONE-HALF TO EDWARD A. RIX, OF SAN FRANCISCO, CALIFORNIA.

CLUTCH FOR ROCK-DRILLING MACHINES.

SPECIFICATION forming part of Letters Patent No. 490,152, dated January 17, 1893

Application filed June 2, 1892. Serial No. 435,287. (No model.)

*To all whom it may concern:*

Be it known that I, SQUIRE H. MACOMBER, a citizen of the United States, residing at Chicago, in the county of Cook and State of Illinois have invented certain new and useful Improvements in Ratchets or Clutches for Rock-Drilling Machines; and I hereby declare the following specification, with the drawings therewith, to be a full, clear, and exact description of my improvements.

My invention relates to ratchets or clutches for rock-drilling machines, such as are impelled by means of air, steam, or other elastic fluid, and to mechanism for causing rotation of such drills, with the pistons or stems to which they are attached.

It consists of a pawl-clutch, or ratchet, connected with what is called a rifle bar, or helical stem, common to all rock drills of the kind, and is arranged with strong pawls meshing into an internally serrated ring or collar, and held in contact therewith by means of springs, the faces of contact being approximately angles of ninety degrees, and equal each way, so that the serrated collar, and also the pawls meshing therein can be reversed, and thus provide a double set of working and wearing surfaces, consequently doubling their endurance.

Figure 1:
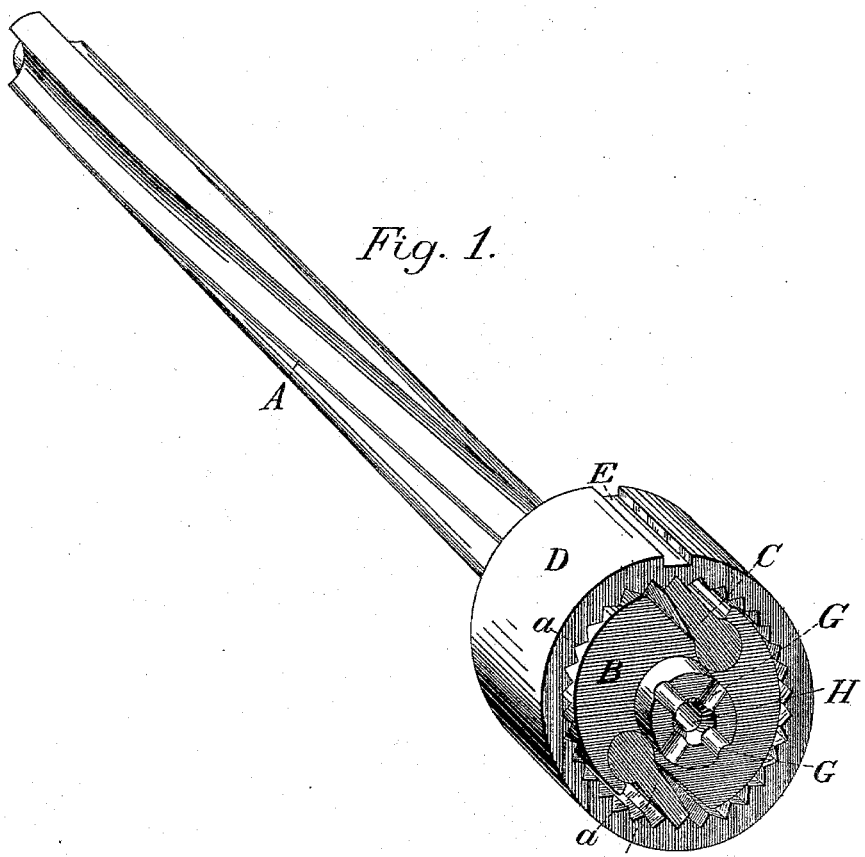
Figure 2:
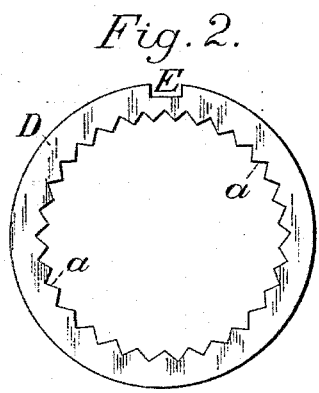
Figure 3:
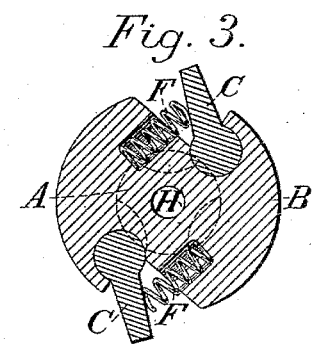

My invention also includes the manner of mounting and supporting the pawls, as set forth in the accompanying drawings, in which:

Figure 1 is a perspective view of the rifle bar of a common rock-drilling machine, with one of my improved clutches applied thereto. Fig. 2 is an end view, in true elevation, of the serrated clutch ring, detached. Fig. 3 is a transverse section through the head of the rifle bar and pawls, showing the manner of mounting and supporting the latter.

Similar letters of reference are employed to denote like parts in the different figures of the drawings.

There is employed in nearly all machines of this class, operating by percussive blows, a grooved, or angular, helical bar or stem, having a fixed nut or matrix in the piston or reciprocating member of the machine, and a ratchet or clutch at the outer end of the bar or stem which prevents rotation in one direction, and permits free rotation in the other direction. This construction is so common, and well understood, that other portions of such machines need not be shown in explaining my invention.

The rifle bar or stem A is fluted or grooved helically, as shown in Fig. 1, so that the head B, formed integrally therewith, would, if left free, have an oscillating rotative movement from right to left, as the matrix or nut was moved up and down, or in and out, on the bar A. This motion of the head B is left free in one direction, but is arrested in the other direction by the detents or pawls C C, so that an intermittent rotation, in one direction, of the bar A, and head B, takes place by action of these pawls.

The ring or collar D is held in a fixed position by means of a key fitting in the groove E. This groove or key way E is made parallel so that the key can be inserted from either side, and the collar reversed if required. The interior face of this collar D is formed with notches or teeth, having an angle preferably of ninety degrees as indicated by the lines $a\,a$, so that the outer ends of the pawls C C will fit therein, in the manner shown in Fig. 1.

The pawls C C are made with a cylindrical base, fitting into corresponding seats in the head B, and are pressed outward by the coil springs F F with force enough to keep them engaged, but permitting an easy rotation of the head B and stem A in a reverse direction.

The notches G and hole H, in the center of the head B are for the purpose of lubrication.

The pawls C C are duplicates in every way and symmetrical as to their two sides, so that they may be reversed or turned over and will fit the same in either position. In this manner, it will be seen, there is provided a double endurance of wear for the working surfaces, and that the parts are so arranged as to withstand the severe strain and jar common to rock-drilling apparatus.

Having thus explained the nature and objects of my invention with the manner of constructing the same, what I claim as new and desire to secure by Letters Patent is—

1. In a rock drill, the herein-described ratchet or clutch device consisting of the helical or spiral stem having an enlarged head provided with the parallel cylindrical seats for two or more pawls, the pawls located within said seats and constructed with cylindrical bases so that they may be easily rotatable and being symmetrical as to their two sides so as to be reversible and the embracing ring or collar surrounding the head and having its inner periphery formed with a series of notches or serrations which are engaged by the aforesaid pawls, together with springs which hold the pawls in engagement with the serrated ring, substantially as described.

2. The herein described ratchet or clutch for rock drilling machines, consisting in the combination of the helical rifle bar or stem A having an enlarged head B, the duplicate pawls C C having cylindrical bases and fitting into corresponding seats in the head B, said pawls having symmetrical sides so that they may be reversed and also may have an easy rotation in their seats, coiled springs F F held within seats in the head B and pressing against the pawls C C with force enough to keep them engaged, but permitting an easy rotation of the head B and stem A in a reverse direction and the rigid ring or collar which is itself held in a fixed position and surrounds the head B, said collar being provided on its interior with notches or serrations that are engaged by the pawls C C, substantially as described.

In testimony whereof I have hereunto affixed my signature in the presence of two witnesses.

SQUIRE H. MACOMBER.

Witnesses:
JOHN WOODBRIDGE, Jr.,
JOHN B. MESNY.